(12) United States Patent
Landingham et al.

(10) Patent No.: US 8,303,883 B2
(45) Date of Patent: Nov. 6, 2012

(54) FORMING FOAM STRUCTURES WITH CARBON FOAM SUBSTRATES

(75) Inventors: Richard L. Landingham, Livermore, CA (US); Joe H. Satcher, Jr., Patterson, CA (US); Paul R. Coronado, Livermore, CA (US); Theodore F. Baumann, Discovery Bay, CA (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 896 days.

(21) Appl. No.: 11/479,796

(22) Filed: Jun. 30, 2006

(65) Prior Publication Data

US 2009/0294088 A1    Dec. 3, 2009

(51) Int. Cl.
*B29C 33/76* (2006.01)
(52) U.S. Cl. ........ 264/317; 264/413; 264/414; 264/415; 264/446; 264/447; 264/45.1; 264/621; 264/642; 264/643; 264/134; 264/135; 264/139; 264/171.26; 264/220; 264/222; 264/241; 977/888; 977/890; 977/893; 977/707

(58) Field of Classification Search .................. 264/317, 264/36.11, 45.3, 45.1, 36.18, 46.7, 413, 414, 264/415, 446, 447, 621, 628, 642, 643, 651, 264/134, 135, 139, 171.26, 220, 226, 222, 264/241; 977/700, 701, 712, 773, 781, 855, 977/857, 859, 888
See application file for complete search history.

(56) References Cited

U.S. PATENT DOCUMENTS

| | | | | |
|---|---|---|---|---|
| 4,402,925 | A * | 9/1983 | Shinko et al. | 423/290 |
| 5,945,084 | A * | 8/1999 | Droege | 423/447.4 |
| 6,500,401 | B2 * | 12/2002 | Reznek et al. | 423/445 R |
| 2003/0050707 | A1 * | 3/2003 | Landingham | 623/23.51 |
| 2009/0120797 | A1 * | 5/2009 | Daigle | 205/85 |

* cited by examiner

*Primary Examiner* — Christina Johnson
*Assistant Examiner* — Stella Yi
(74) *Attorney, Agent, or Firm* — John P. Woodridge

(57) ABSTRACT

The invention provides foams of desired cell sizes formed from metal or ceramic materials that coat the surfaces of carbon foams which are subsequently removed. For example, metal is located over a sol-gel foam monolith. The metal is melted to produce a metal/sol-gel composition. The sol-gel foam monolith is removed, leaving a metal foam.

26 Claims, 2 Drawing Sheets

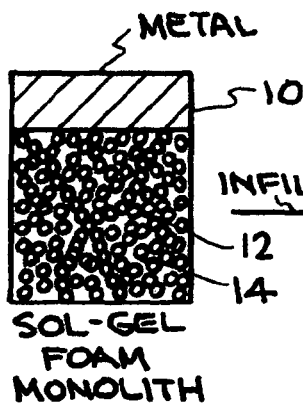
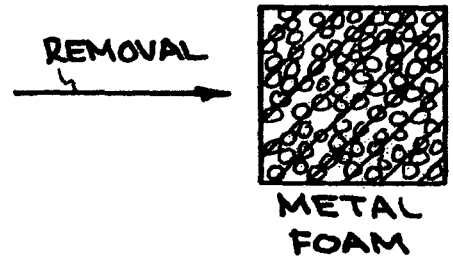
FIG. 1A    FIG. 1B    FIG. 1C
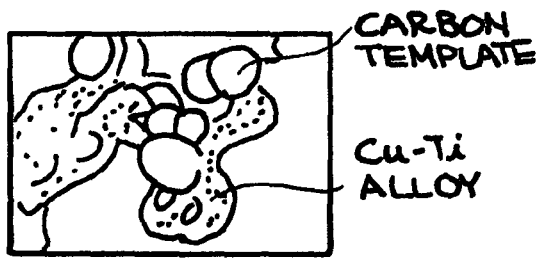
FIG. 2A      FIG. 3A
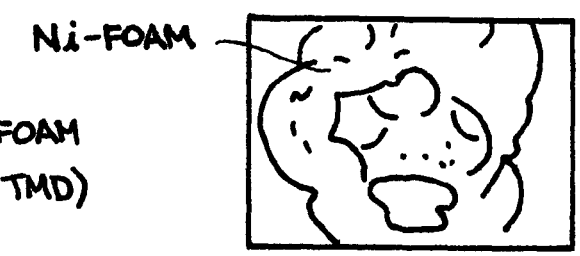
FIG. 2B      FIG. 3B

CRF SPHERES ~3-8mm

CRF SPHERES COATED W/ Cu/Ti ALLOY

FORMING FOAM STRUCTURES WITH CARBON FOAM SUBSTRATES

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to methods for making foam structures, and more specifically, it relates to method for making fine-cell foam-structures of metals or ceramics by coating a carbon substrate formed by the sol-gel process.

2. Description of Related Art

Fine-cell structures of metal or ceramic are desirable for many uses. Foams having cell sizes that are less than 20 microns in diameter are needed for retention of liquids and compounds. These small cell foams slow the leakage of such liquids from the foams to reduce immediate spills. The small cell sizes have utility, e.g., in applications such as catalysis, fuel cells, hydrogen storage and sensors. Currently, metal and ceramic foams are formed by utilizing a foaming step. The resulting foam has a cell structure that is uncontrolled. The following patents are exemplary. U.S. Pat. No. 6,998,535, titled: "Metal foam casting apparatus and method" is directed to a method for casting articles from metal foam includes a molten metal bath and a foam forming means. The foam is drawn into a ladle, within a heated chamber, which transports a foam sample to a mold. The ladle deposits the foam sample into the mold and the mold is closed. Once cooled and hardened the formed article is removed. The system of the invention comprises a molten metal bath, a heated foam collecting chamber, a ladle for drawing a sample of the foam and for transporting the sample to a mold. The present invention provides an apparatus for carrying out. U.S. Pat. No. 6,915,834, titled: "Process for producing metal foam and metal body produced using this process" relates to a process for producing metal foam and to a metal body produced using this process. The object is achieved by a process for producing metal foam by adding a blowing agent to a metal melt, wherein the metal melt is introduced into the die cavity of a metal die-casting machine and is foamed using a blowing agent which releases gases and is solid at room temperature. U.S. Pat. No. 6,932,925, titled: "Method of manufacturing a super-lightweight ceramic foam" is directed to a lightweight ceramic foam with a cellular structure effectively reinforced by ceramic short fibers, which has a density of 0.2 g/cm.sup.3 or less and a sufficient strength. The ceramic foam is prepared by evenly dispersing ceramic short fibers throughout a non-aqueous solvent through the use of the reactivity of metal alkoxide with the surface of the ceramic short fibers, adding into the nonaqueous solvent an aqueous slurry containing ceramic powder dispersed therein, allowing the evenly dispersed ceramic fibers to move into an aqueous phase separately from a nonaqueous solvent phase so as to obtain an aqueous slurry containing the ceramic fibers evenly dispersed therein, and foaming and firing the aqueous slurry. Methods for forming metal or ceramic foams having specified cell sizes are desirable for a variety of applications. The present invention provides such methods.

SUMMARY OF THE INVENTION

It is an object of the present invention to provide a method for producing metal and ceramic foams having a desired cell size.

It is another object of the invention to provide a method for coating the surface of a carbon foam substrate with a coating material of a metal or a ceramic and removing the carbon foam substrate from said structure to produce a foam.

These and other objects will be apparent based on the disclosure herein.

The invention provides foams of desired cell sizes formed from metal or ceramic materials that coat the surfaces of carbon foams which are subsequently removed. The basic steps of one embodiment locate metal over a sol-gel foam monolith. The metal is melted to produce a metal/sol-gel composition. The sol-gel foam monolith is removed, leaving a metal foam. This process produces fineell foam-structures of metals or ceramics by coating a carbon substrate formed by the sol-gel process. These sol-gels have ultra-fine cell/pore sizes, continuous porosity, high surface area, and a micro-structure composed on interconnected colloidal-like particles or polymeric chains. The materials are composed of interconnected spherical particles with size from nominally 3 to 20 nm and the mesopores are associated with the interstices between the particles.

Conditions can be adjusted to produce spherical particles outside this range. A special thermal processing procedure is used to convert this form into a carbon foam with similar microstructure. The resulting carbon foam substrate is then coated with the desired metal or ceramic by fluid, gas, and/or thermal deposition processes. The carbon substrate is removed. One way to remove the carbon is by reacting the carbon with oxygen at elevated temperatures to form $CO_2$ gas. Other ways are also provided and still other ways will be apparent to those skilled in the art base on the teachings herein. The resulting coating is a foam of the metal coating with a structure that is similar to that of the initial carbon foam.

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1A shows a metal located over a container of a sol-gel foam monolith.

FIG. 1B shows the metal/sol-gel composition produced by the infiltration process.

FIG. 1C shows the metal foam that is produced by removing the sol-gel foam monolith.

FIG. 2A shows a carbon template partially surrounded by a Cu—Ti alloy.

FIG. 2B shows the Cu—Ti foam produced by removing the carbon template.

FIG. 3A shows Ni deposited onto a carbon template by electroless deposition.

FIG. 3B shows the Ni foam produced by removing the template.

DETAILED DESCRIPTION OF THE INVENTION

Figure 4A:
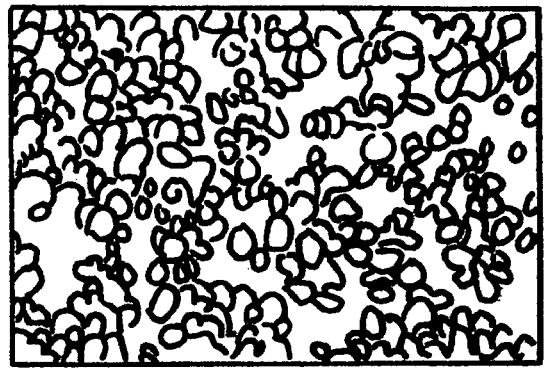
FIG. 4A shows CRF spheres.

Foams of desired cell sizes can be formed from materials described herein that coat the surfaces of carbon foams and allow the carbon substrates to be removed by combustion or other reactions or processes. This is a bulk process that is readily amendable to scale-up and the composition of the final foam can be adjusted. The basic steps of a method for preparation of nanocellular metal foams are illustrated in FIG. 1A-1C. FIG. 1A shows a metal 10 located over a container 12 of a sol-gel foam monolith 14. The infiltration process, produced by melting the metal 10, produces a metal/sol-gel composition shown in FIG. 1B. The sol-gel foam monolith (e.g., a carbon template) is removed, leaving a metal (e.g., a Cu—Ti alloy) foam 16 as shown in FIG. 1C.

Embodiments of this process produce fine-cell foam-structures of metals or ceramics by coating a carbon substrate formed by the sol-gel process. The carbon substrate is prepared by a sol-gel process that produces open-cell foams derived from highly cross-linked inorganic or organic gels. These sol-gels are dried by a variety of techniques to preserve the tenuous solid network. These sol-gels have ultra-fine cell/pore sizes, continuous porosity, high surface area, and a microstructure composed on interconnected colloidal-like particles or polymeric chains with characteristic diameters of 100 Angstroms. This microstructure is responsible for their unusual optical, acoustical, thermal and mechanical properties. At lower pH, an increase in the acid-catalyzed condensation reactions occur, which leads to formation of a highly cross-linked structure. From TEM studies under these conditions, the materials are composed of interconnected spherical particles with size from nominally 3 to 20 nm and the mesopores are associated with the interstices between the particles.

Figure 4B:
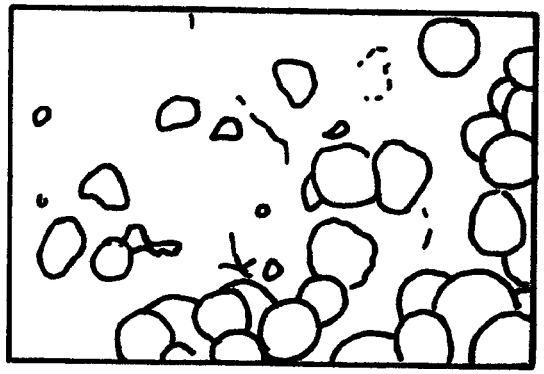
FIG. 4B shows the CRF spheres coated with a Cu—Ti alloy.
Figure 4C:
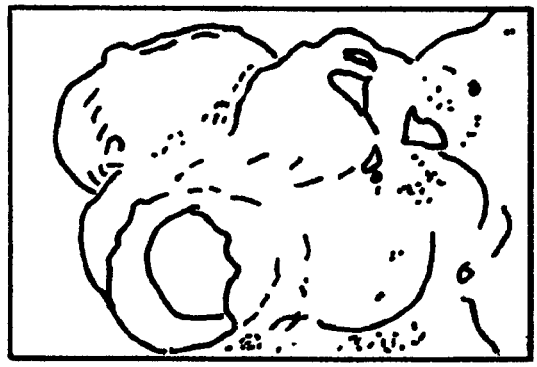
FIG. 4C shows the Cu—Ti foam after the CRF has been removed.

Conditions can be adjusted to produce spherical particles outside this range. A special thermal processing procedure is used to convert this form into a carbon foam with similar microstructure. The resulting carbon foam substrate is then coated with the desired metal or ceramic by fluid, gas, and/or thermal deposition processes. The carbon substrate is removed. One method for removing the carbon substrate is by reacting with oxygen at elevated temperatures to form $CO_2$ gas. The resulting coating is a foam of the metal coating with a structure that is similar to that of the initial carbon foam. FIG. 2A shows a carbon template 20 partially surrounded by a Cu—Ti alloy 22. FIG. 2B shows the Cu—Ti foam produced by removing the carbon template. FIG. 3A shows Ni deposited onto a carbon template by electroless deposition. FIG. 3B shows the Ni foam. FIG. 4A shows CRF spheres. FIG. 4B shows the CRF spheres coated with a Cu—Ti alloy. FIG. 4C shows the Cu—Ti foam after the CRF has been removed. The carbon substrate can be removed by other methods as well. Other methods for removing the carbon will be apparent to those skilled in the art based on the disclosure herein. For example, the carbon substrate can be removed by chemical oxidizing agents, plasma oxidation, and electro-discharge in oxidizing agents or atmospheres. The heat treating method can include oxidation at lower temperatures than 400 C if in a partial oxygen vacuum or a high oxygen atmospheres is used. The heat treatment to ≦400 C in air is convenient method. Under rare circumstances, heating may effect the coating on the carbon and lower temperatures in a oxidizing agent (H2O2, acids, etc) could be used to oxidize the carbon without effecting the coating.

The sol-gel process is used to form a carbon foam substrate with a cell size and porosity of the desired microstructure. The parameters used to form this carbon foam can be varied over a wide range to produce foam structures of widely varying properties. Depending on the parameters selected, a carbon foam structure can be formed that will allow one of the coating techniques to be used to coat the surface of the carbon structure.

A typical method of depositing such a coating on the carbon foam substrate would be carried out as follows. A metal alloy consisting of 20 weight % titanium-balance copper (TiCu) is placed on top of a plate of the carbon foam and heated in a vacuum furnace to 1300 C for one hour. The alloy melts and coats the carbon substrate surfaces with a thin coating of the molten alloy. This process is known as molten metal infiltration (MMI). The degree of infiltration and coating is dependent on the wetting nature (wettability) of the molten metal to the surface of the carbon substrate. The wettability can be adjusted by infiltration time and temperature, atmosphere, metal composition, surface condition of the carbon substrate, and pore sizes in the carbon structure. The composition of the metal alloy can be adjusted to alter the properties of the infiltration and the ultimate product The carbon substrate can be removed from the coated foam structure by heat treating the foam in air. The carbon foam reacts with oxygen in the air to form CO2 gas. The metal coating remains as a fine foam of metal. Depending on the composition of the metal alloy, subsequent treatments can be used to convert the metal into a ceramic or cermet (partially metal and partially ceramic). Other methods of coating the carbon substrate include chemical vapor deposition (CVD), electrochemical deposition, and electroless-chemical deposition.

Once the carbon substrate is formed, a coating is applied to the surface or reacted with the surface to form a continuous porous body of the desired composition. The carbon can remain or be removed as desired to get the final porous body. By heating the body in air to ≦400 C, the carbon structure is removed as COx gases. There are several typical processes that can be used to deposit the coating onto the carbon surface, e.g., electroless and electro-plating a copper coating on the carbon. Many other metal coatings could be applied by this process (gold, silver, nickel, iron, etc.) Some metals would need a vapor process to be coat onto carbon like tungsten, hafnium, platinum, niobium, etc. The vapor of some of these metals is passed through the porous carbon body and condenses on the surface. Vapors of these and other metals could also be transferred as halides and reduced on the surface of the carbon with hydrogen or other reducing vapors that reduce the halides (including bromides, iodides, fluorides, etc.) In some cases the carbon form may reduce the vapor agent into the desired coating at contact with the carbon at elevated temperatures. The coating thickness is dependent on the temperature, time and concentration of the vapors. Such coatings range from nanometers to several microns at their reactive temperatures with minutes. Non-metal coatings are also possible in many cases. The use of metal salts in solutions can be infiltrated into the pores of the carbon structure and reacted or reduced to form a non-metal coating. If a water solution is employed, the resulting coating is generally an oxide (Y2O3, ZrO2, Al2O3, etc.) If a non-aqueous solution is used, fluorides, carbides, nitrides, borides, etc. can be deposited. The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:
1. A method, comprising:
    coating the surface of a carbon foam substrate with a metal coating material, wherein said carbon foam substrate comprises particle sizes within a range from 3 nm to 20 nm and further comprises mesopores, wherein said coating material conforms to the shape of said carbon foam substrate and hardens to produce a structure having a solid shape; and removing said carbon foam substrate from said structure.

2. The method of claim 1, further comprising preparing said carbon foam substrate by a sol-gel process.

3. The method of claim 2, wherein said sol-gel process is selected to produce open-cell foam.

4. The method of claim 3, wherein said open-cell foam is derived from a cross-linked gel.

5. The method of claim 4, wherein said cross-linked gel comprises inorganic gel.

6. The method of claim 4, wherein said cross-linked gel comprises organic gel.

7. The method of claim 1, further comprising drying said coating material prior to the step of removing said carbon foam substrate from said structure.

8. The method of claim 7, wherein the step of drying comprises a drying technique selected to preserve said solid shape said structure.

9. The method of claim 1, wherein the step of coating is carried out by a deposition process selected from the group consisting of a fluid deposition process, a gas deposition process, and a thermal deposition process.

10. The method of claim 1, wherein the step of removing said carbon foam substrate from said structure is carried out by reacting said carbon foam substrate with oxygen at an elevated temperature to form $CO_2$ gas.

11. The method of claim 1, wherein said carbon foam substrate comprises a cell structure desired to be produced in said structure.

12. The method of claim 11, wherein said cell structure comprises a cell size and porosity desired to be produced in said structure.

13. The method of claim 2, wherein said sol-gel process is selected to produce a carbon foam substrate comprising a cell structure desired to be produced in said structure.

14. The method of claim 13, wherein said cell structure comprises a cell size and porosity desired to be produced in said structure.

15. The method of claim 1, wherein the step of coating is carried out with a process of molten metal infiltration (MMI).

16. The method of claim 15, wherein said process of MMI includes controlling the degree of infiltration and coating.

17. The method of claim 16, wherein the step of controlling the degree of infiltration and coating is carried out by selecting a desired wettibility of said coating material.

18. The method of claim 17, further comprising adjusting said wettibility by using a parameter selected from the group consisting of infiltration time, infiltration temperature, atmosphere, metal composition, surface condition of said substrate and pore size in said structure.

19. The method of claim 16, wherein said metal comprises an alloy.

20. The method of claim 1, wherein the step of coating is carried out by a deposition process selected from the group consisting of chemical vapor deposition (CVD), electrochemical deposition and electroless-chemical deposition.

21. The method of claim 1, wherein said structure comprises a continuous porous body.

22. The method of claim 10, wherein said elevated temperature comprises no more than 400 degrees C.

23. The method of claim 1, wherein the step of removing said carbon foam substrate from said structure is carried out by reacting said carbon foam substrate with a chemical oxidizing agent.

24. The method of claim 1, wherein the step of removing said carbon foam substrate from said structure is carried out plasma oxidation.

25. The method of claim 1, wherein the step of removing said carbon foam substrate from said structure is carried out with electro-discharge in an oxidizing agent.

26. The method of claim 1, wherein the step of removing said carbon foam substrate from said structure is carried out with electro-discharge in an atmosphere.

* * * * *